F. O. MOESMER.
HOSE MOUNTING PROTECTOR.
APPLICATION FILED NOV. 11, 1919.
1,396,452.
Patented Nov. 8, 1921.
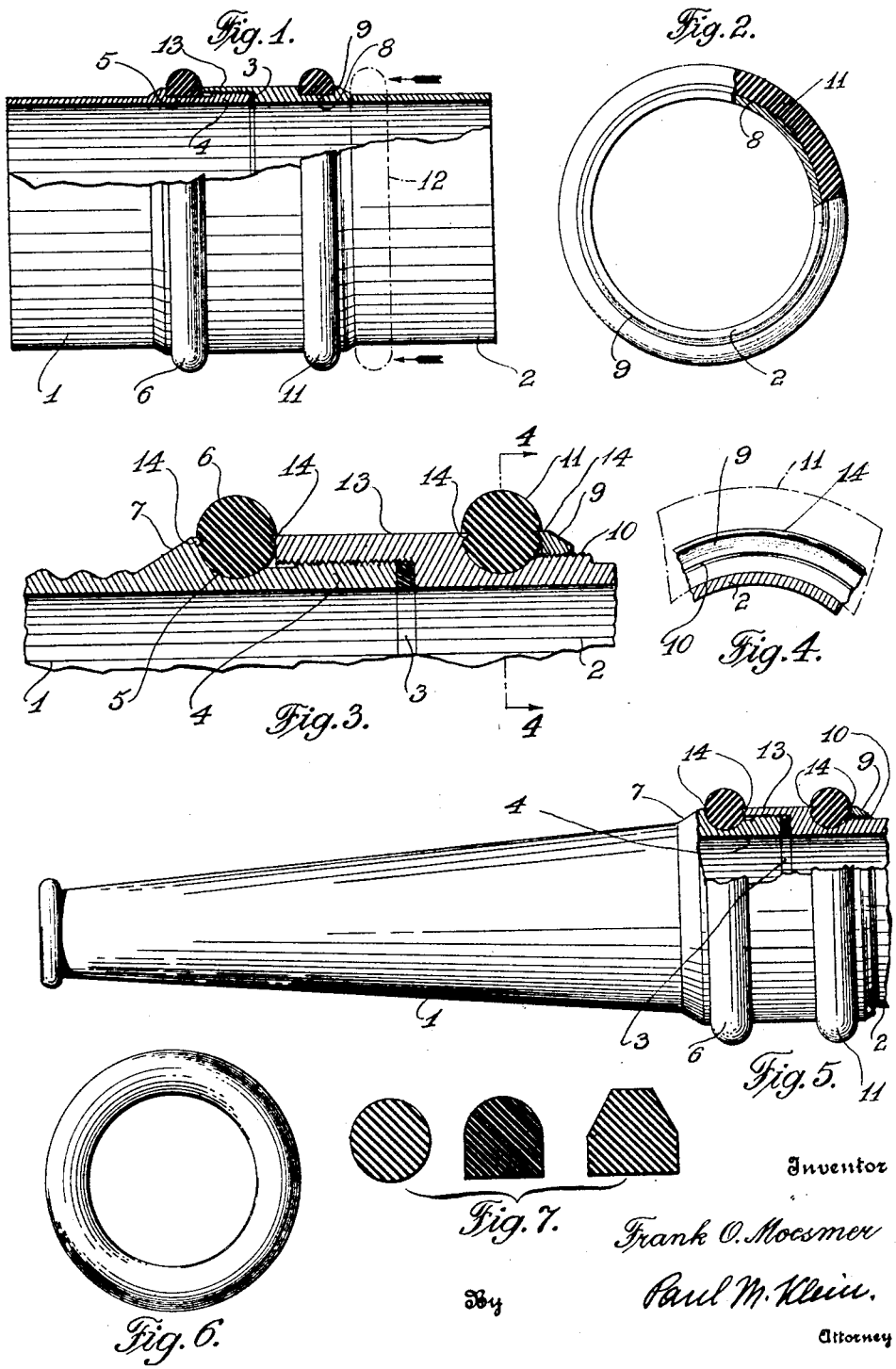

UNITED STATES PATENT OFFICE.

FRANK O. MOESMER, OF BROOKLYN, NEW YORK, ASSIGNOR OF ONE-HALF TO CHARLES CHRISTMAN, OF QUEENS, NEW YORK.

HOSE-MOUNTING PROTECTOR.

1,396,452.     Specification of Letters Patent.     Patented Nov. 8, 1921.

Application filed November 11, 1919. Serial No. 337,240.

*To all whom it may concern:*

Be it known that I, FRANK O. MOESMER, citizen of the United States, and resident of Brooklyn, New York city, in the county of Kings and State of New York, have invented certain new and useful Hose-Mounting Protectors, of which the following is a specification.

This invention relates to hose mountings.

The use of hose mountings, especially couplings and hose nozzles is generally known to be a very difficult problem when intrusted to the hands of careless help.

It becomes a costly item particularly where concrete or other hard flooring is predominant and when the hose is being handled at a considerable height above the floor. It is then subjected to violent contact with hard objects when accidentally or carelessly released and dropped, causing deformities in the most tender spot of the mounting, the threaded parts. Once thus damaged the mounting becomes permanently useless.

Especially hose mountings for indoor industrial purposes and garden hose mountings are very likely to be ruined since their construction and design is calculated for easy manipulation and light weight.

Such mountings are very fragile and likely to be deformed even when carefully handled.

The object of my invention is to meet and remedy this defect.

I accomplish this by providing protecting means, preferably of resilient material, around the mounting and on both sides of or very near to its threaded portions, since the latter are usually most exposed to abuse.

These mounting protectors are preferably made in ring form and of one piece.

Both the male and female members receive one or more of such protectors which are placed into annular grooves, the outer side or wall of which preferably forms conical rims. The inner diameter of the resilient protector is somewhat smaller than the diameter of the groove bottom, and when slipped over the conical rims into the groove it snaps therein and is firmly held in place by its own properties.

In order to prevent eventual dislocation of the protector, the edges of the grooves may be provided with annular projections, prongs or other means which are impressed into the protector material.

The mounting protector of the male member may also serve as additional packing ring. The outer diameter of the protectors is far larger than the outer diameter of the mounting. Therefore, when the mounting is dropped, the protectors will absorb the shock and avert any damage to the mounting.

When very heavy protector rings are used it will be hard to expand them when attaching to the mountings. For such cases I have provided means whereby the conical part of the groove may be removed, the protectors slipped upon the mounting, and the conical part replaced.

The foregoing will be more fully understood from the following description and the accompanying drawings, in which:

Figure 1 is an elevation of one preferred form of my invention, partially in section.

Fig. 2 is an end view of same, partially in section.

Fig. 3 is an enlarged detail view of another form of my device.

Fig. 4 is a sectional view taken on line 4—4 of Fig. 3.

Fig. 5 is an elevation of a nozzle showing my device.

Fig. 6 is a detail view of a protector.

Fig. 7 illustrates different sections of a protector.

In the drawings the male member 1 is shown connected with female member 2 in the usual way, a packing ring 3 being placed between the faces of both members. Behind the threaded portion 4 of the wall member 1 an annular groove 5 is provided which may be shaped according to the shape and form of the protector 6 placed therein. The outer side of the groove 5 is formed by the cone-shaped rim 7 which may be either an integral part of the male member or a separate ring attachable thereto.

The female member 2 possesses a similar groove 8 and a similar conical rim 9 which also may be either of one piece with the female member or a separate ring, as shown in Figs. 3, 4, and 5. The ring may be secured to the mounting in any desired way for instance by threads, as indicated at 10.

The mounting protectors 6 and 11 are, as has been said, of somewhat smaller inner diameter than the diameter of the groove bottom and are slipped over the rim 7 or 9 as indicated in Fig. 1 by dashed and dotted lines 12 and the arrows, when they can be stretched. When they will not yield or when not resilient they may be attached by demountable rims.

Being of far larger outer diameter than the outer diameter of the mounting, the protectors 6 and 11 will not only prevent the mounting from coming into damaging contact with an object, but will also serve as reinforcement for fragile, light mountings.

The protector 7 surrounding the male member 4 serves not only for the above mentioned purpose but takes the place of an additional packing, being pressed by the threaded end 13 of the female member 2 against the rim 7 of the male member 4.

In order to assure a positive seat for the protectors, and securing them, when loosened through long wear, from leaving the grooves, the groove edges are equipped with either an annular knife-formed projection pins, prongs or other means indicated at 14 which project into the grooves and clamp the protectors into unyielding position.

While I am referring to resilient protectors, and while the drawings show but a few preferred forms of my invention, be it understood that my invention shall not be limited thereby and that any material accomplishing the results sought may be used and that changes and improvements may be made without departing from the broad scope of my invention.

I claim:—

1. A hose mounting comprising a male and a female member, said male member having an annular receiver with one side formed by a cone-shaped rim, the other side being formed by the free end of said female member, a similar annular groove provided in the female member, a pair of ring-shaped resilient mounting protectors the inner diameter of which is substantially the same as or slightly smaller than the diameters of groove bottoms, said protectors, being forcibly slipped over the conical rim into the grooves preventing said mounting from coming into damaging contact with an object, said protector secured to the male member also serving as packing.

2. In combination with a hose mounting as set forth in claim 1, means projecting into the grooves at their edges for preventing said protectors from turning, voluntarily leaving or becoming loose in said groove.

3. A hose mounting comprising male and female members, annular grooves provided in the mounting, one portion of one of said grooves being made in the male, the other in the female member, a pair of annular protectors fitting in said grooves and extending beyond the periphery of the body of the mounting, one of the protectors registering with the groove made partly in the male and female members.

4. In a hose mounting comprising male and female members, an annular recess formed partly in the male partly in the female member, a pair of mounting protectors associated with the mounting and snugly fitting thereon, one of said protectors resting in the recess formed partly in one and partly in the other member.

5. In a hose mounting composed of two members having resilient mounting protectors, an annular recess providing a seat for one protector on one of the members, another annular recess formed partly in one and partly in the other member and providing a seat for the other protector, both protectors being of larger diameter than the largest diameter of the mounting body.

Signed at New York city, in the county of New York, and State of New York, this 31st day of October A. D. 1919.

FRANK O. MOESMER.